United States Patent
Langlotz

(10) Patent No.: US 10,415,870 B2
(45) Date of Patent: Sep. 17, 2019

(54) PRESSURE RELIEF FACILITY FOR REFRIGERATION APPLIANCES

(71) Applicant: Bennett Karl Langlotz, Dallas, TX (US)

(72) Inventor: Bennett Karl Langlotz, Dallas, TX (US)

( * ) Notice: Subject to any disclaimer, the term of this patent is extended or adjusted under 35 U.S.C. 154(b) by 446 days.

(21) Appl. No.: 15/267,569

(22) Filed: Sep. 16, 2016

(65) Prior Publication Data

US 2018/0080701 A1     Mar. 22, 2018

(51) Int. Cl.
| F25D 17/04 | (2006.01) |
| F25D 23/08 | (2006.01) |
| F25D 23/02 | (2006.01) |
| F25D 21/12 | (2006.01) |

(52) U.S. Cl.
CPC ......... *F25D 17/047* (2013.01); *F25D 21/125* (2013.01); *F25D 23/028* (2013.01); *F25D 23/08* (2013.01); *F25D 23/087* (2013.01); *Y02B 40/34* (2013.01)

(58) Field of Classification Search
CPC ...... F25D 17/047; F25D 23/08; F25D 23/082; F25D 23/085; F25D 23/087; F25D 23/028; F25D 21/02; F25D 21/025; F25D 21/125; Y02B 40/34
See application file for complete search history.

(56) References Cited

U.S. PATENT DOCUMENTS

| 3,167,931 A * | 2/1965 | Bryson ................. F25D 17/047 220/203.01 |
| 3,201,833 A * | 8/1965 | Bryson ................. F25D 17/047 220/378 |
| 3,331,648 A * | 7/1967 | Petkwitz ............... F25D 17/047 312/296 |

(Continued)

FOREIGN PATENT DOCUMENTS

| DE | 3000202 A1 * | 7/1980 | ............ F25C 17/047 |
| DE | 102006061153 A1 * | 6/2008 | ........... F25D 17/047 |

(Continued)

*Primary Examiner* — Daniel J Troy
*Assistant Examiner* — Ryan A Doyle
(74) *Attorney, Agent, or Firm* — Bennet K. Langlotz; Langlotz Patent & Trademark Works, LLC

(57) ABSTRACT

A pressure relief facility for a refrigeration appliance with a body defining a chamber and having a peripheral rim, the appliance having a door with a peripheral gasket operable between an open position in which the gasket is away from the rim and a closed position in which the gasket sealably contacts the rim. The relief facility includes a planar body having opposed major faces and having opposed first and second peripheral edges. The body has a number of passages adjacent to each other, each passage having a first opening at the first peripheral edge, and a second opening at the second peripheral edge. An adhesive element is attached on one of the major faces adapted to secure the body to the rim of the appliance body in registration with to the gasket with the first openings in communication with the chamber, and (Continued)

the second openings in communication with ambient air. The planar body may be an elongated rectangular piece of corrugated plastic, with the passages running transverse to the length.

20 Claims, 2 Drawing Sheets

(56) References Cited

U.S. PATENT DOCUMENTS

| | | | | |
|---|---|---|---|---|
| 3,434,239 | A * | 3/1969 | Schwenker | F25D 17/047 49/478.1 |
| 5,228,314 | A * | 7/1993 | Kawai | B65D 81/18 220/366.1 |
| 5,947,817 | A * | 9/1999 | Morris | E04D 1/36 454/365 |
| 6,039,646 | A * | 3/2000 | Sells | E04D 3/40 454/365 |
| 6,267,668 | B1 * | 7/2001 | Morris | E04D 13/174 454/365 |
| 6,938,383 | B2 * | 9/2005 | Morris | E04B 1/26 52/198 |
| 7,726,754 | B2 * | 6/2010 | Keller | F25D 17/047 312/296 |
| 2006/0116069 | A1 * | 6/2006 | Urbanski | E04D 13/174 454/365 |
| 2009/0320515 | A1 * | 12/2009 | Bischofberger | F25D 17/047 62/449 |

FOREIGN PATENT DOCUMENTS

| | | | | |
|---|---|---|---|---|
| DE | 102008041187 | A1 * | 2/2010 | F25D 17/047 |
| DE | 102015220351 | A1 * | 4/2017 | F25D 17/047 |
| DE | 102015222924 | A1 * | 5/2017 | F25D 17/047 |
| EP | 2597403 | A2 * | 5/2013 | F25D 17/047 |

* cited by examiner

PRESSURE RELIEF FACILITY FOR REFRIGERATION APPLIANCES

FIELD OF THE INVENTION

This invention relates to venting of chambers, and more particularly to the relief of pressure differences in Refrigeration Appliances.

BACKGROUND AND SUMMARY

Refrigerators and Freezers employ gasketed doors to provide an insulated chamber without significant leakage and energy loss. However, in some appliances such as newer freezers the appliance is so tight and the gasket so effective that users have trouble opening the door, particularly after it was recently shut.

When door of an upright freezer kept at 0 degrees Fahrenheit is opened, the cold air flows downwardly outward from the chamber, while the contents remain cold. What the door is closed a short time later, the cold air has been replaced by much warmer ambient air. This newly-trapped warm air is rapidly chilled by contact with the frozen contents and structure, and naturally contracts. This creates a substantial pressure differential that effectively sucks the door closed. For a large freezer with a door 3 feet wide and six feet tall, the surface area is 2592 square inches. A pressure differential of only 0.04 PSI is enough to initially create a total force of more than 100 pounds on the door, making it effectively impossible to open. At this level of suction, the door and handle may be damaged by determined efforts to open the freezer.

Because the gasketing is imperfect, the pressure will eventually equalize as ambient air leaks into the chamber. However, this pressure relief is often frustratingly slow, such as when a user lets the door close just before remembering to get something else from the freezer. This "time lock" effect generates a need for a facility to relieve the pressure differential at a reasonable and selectable rate without introducing unjustifiable energy waste and or irreversible disadvantages.

The preferred embodiment addresses these and other needs by providing a pressure relief facility for a refrigeration appliance with a body defining a chamber and having a peripheral rim, the appliance having a door with a peripheral gasket operable between an open position in which the gasket is away from the rim and a closed position in which the gasket sealably contacts the rim. The relief facility includes a planar body having opposed major faces and having opposed first and second peripheral edges. The body has a number of passages adjacent to each other, each passage having a first opening at the first peripheral edge, and a second opening at the second peripheral edge. An adhesive element is attached on one of the major faces adapted to secure the body to the rim of the appliance body in registration with to the gasket with the first openings in communication with the chamber, and the second openings in communication with ambient air. The planar body may be an elongated rectangular piece of corrugated plastic, with the passages running transverse to the length.

DETAILED DESCRIPTION OF A PREFERRED EMBODIMENT

Figure 1:
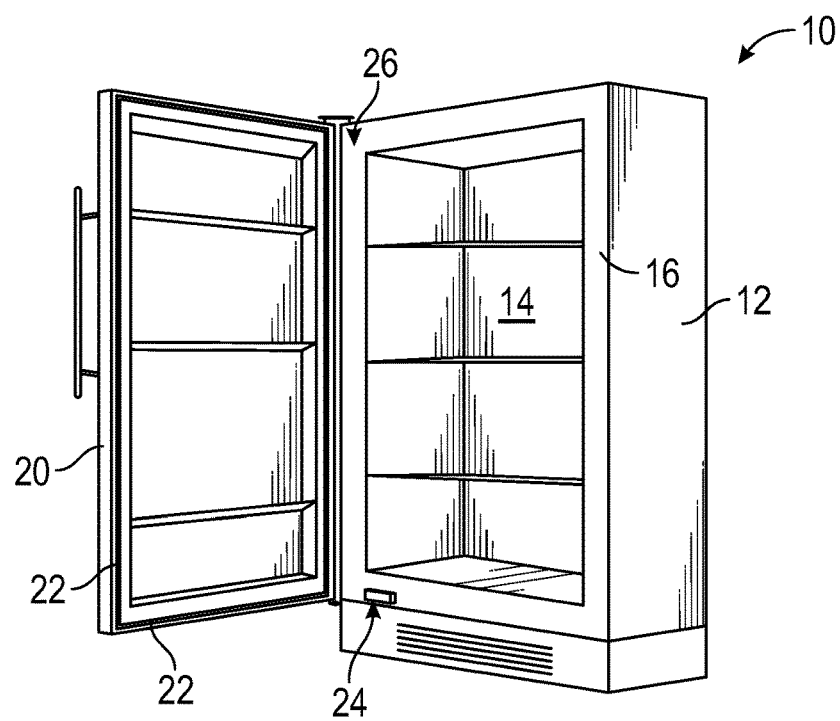
FIG. 1 is a view of a freezer including a preferred embodiment of the invention.

FIG. 1 shows a refrigeration appliance such as a freezer 10 having a main body 12 defining a chamber 14. The front face of the body is a flat planar rim 16. A door 20 is hinged to the body, and is shown in an open condition. The door includes a gasket 22 on a major face near the periphery. When the door is in a closed condition the gasket contacts the rim 16 to provide a seal to prevent significant air leakage.

Figure 2:
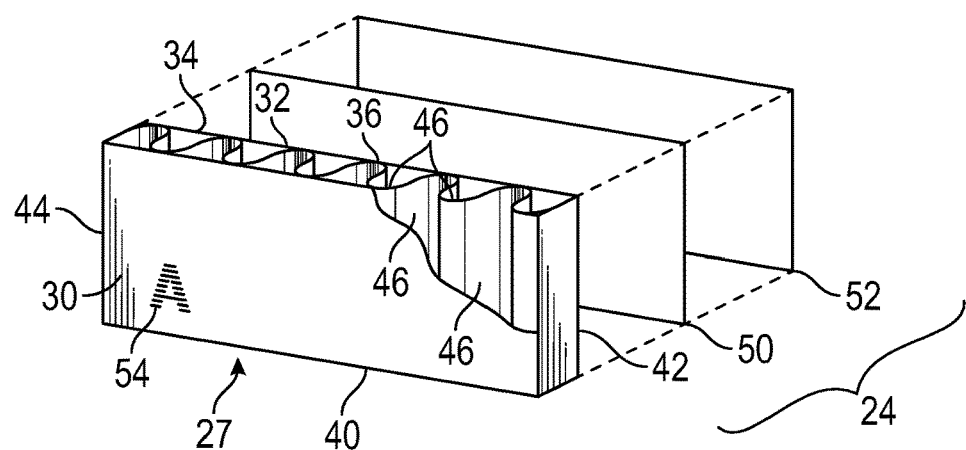
FIG. 2 is a perspective view of the embodiment of FIG. 1.

A ventilation pressure relief device 24 is adhered to the rim at a lower portion of the rim near the hinge 26. As show in FIG. 2 the device 24 is an elongated rectangular piece or sheet 27 of conventional corrugated plastic such as used for outdoor temporary signage. This is also referred to as an extruded twinwall plastic-sheet product produced from high-impact polypropylene resin with a similar structural form to corrugated fiberboard. It has a flat front sheet 30, an opposed flat rear sheet 32, and an articulated or corrugated inner sheet 34 that alternately is connected to the front and rear sheets. The device has an upper peripheral edge 36 and an opposed parallel peripheral edge 40, with the upper and lower edges extending lengthwise along the elongated sheet. Side edges 42 and 44 are significantly shorter. The corrugations define parallel passages 46 that extend perpendicular to the edges 36 and 40, and extend fully to those edges.

An adhesive film or sheet 50 is attached to the rear face of the device, and is covered by a release film 52 that covers the adhesive during transport and storage until it's time to install the device on a freezer or refrigerator. The adhesive preferably covers the entire back surface, but need only provide enough adhesive strength to hold the device in place. In alternative embodiments, the adhesive may be replaced by magnetic or other attachment methods, including mechanical fasteners. The front of the sheet may be printed, embossed, or labeled with indicia indicating the source or origin of the device, a brand name of the appliance manufacturer, instructions, or any other information.

Figure 3:
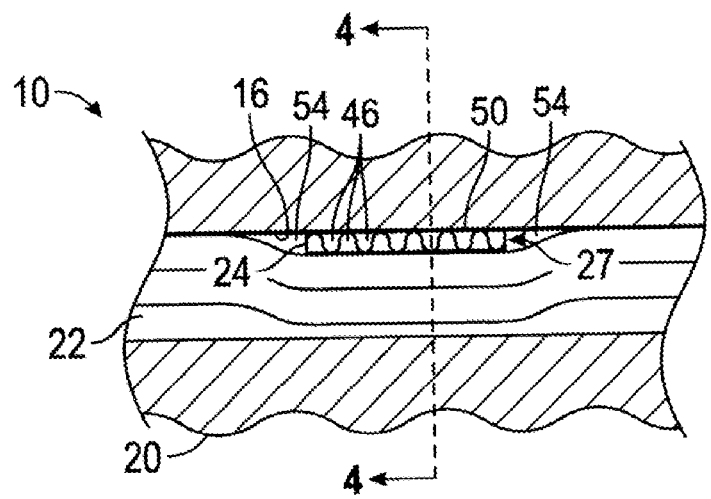
FIG. 3 is a top sectional view of the embodiment of FIG. 1.

FIG. 3 shows the device 24 attached to the rim 16 of the freezer 10, with the adhesive 50 securing the corrugated element 27. The corrugations are linear channels perpendicular to the plane of the image. The gasket is shown as being deflected so that air may flow through the passages 46 as well as through gaps 54 at either end of the device.

Figure 4:
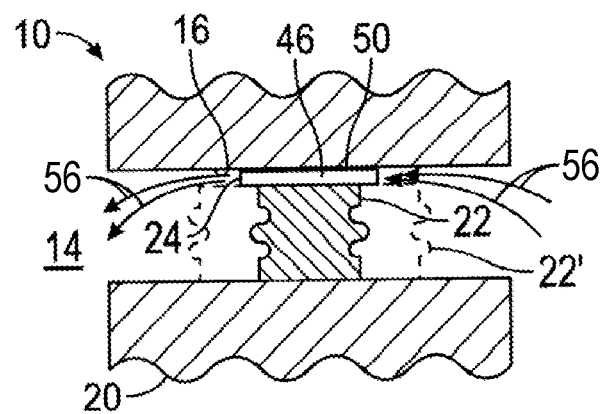
FIG. 4 is a side sectional view of the embodiment of FIG. 1 taken along line 4-4 of FIG. 3.

FIG. 4 shows the device 24 in a sectional view cut across the length of the gasket, with the upward direction being toward the left. After the freezer door is closed, the contraction of the newly-captured ambient air due to cooling generates a relatively low pressure in the chamber 14, creating an airflow 56 into the chamber. An alternative gasket 22' is illustrated to provide a circumstance in which the height of the device is less than the gasket width and still effective because of the stiffness of the inner surface of the gasket.

Preferably, the device is about the same width as a standard gasket, which is normally about 1" wide. However, the device operates suitably with a width of ½" or more. The device may have any width limited by the width of the freezer rim, and aesthetic desires to avoid its conspicuous placement. A width (vertical dimension as installed) of 2" is considered a suitable maximum in most installations.

The length of the device is based on balancing more rapid ability to reopen a just-closed door, against the interests of avoiding excessive opening that can lead to unwanted air exchange when the door is closed. Typically, this is about 2" to provide desired performance, and may be suitable with only 1" for applications such as refrigerators with less extreme temperature changes, and for freezers with smaller volumes or smaller doors where the suction effect is less strong. A standard 2" length provides a 2:1 length to width ratio, with this ratio preferably greater than 1:1 to provide adequate venting, and less than about 4:1 to avoid excessive temperature transfer.

The device may have any of a wide range of thicknesses. Standard material of 3 mm, 4 mm, 5 mm, 5/32" or 3/16" is suitable, and thinner or thicker options may also be suitable for some applications.

The use of corrugated material serves to provide adequate stiffness against crushing by the forces applied by the door gasket. The inner corrugated layer provides this stiffness with a thin sheet that does not more than minimally reduce the air flow during a suction relief event, providing rapid reopening recovery. Each passage is much longer than it is wide, with the width of each passage being about the thickness of the device. For a 3/16" sheet, with a 1" passage length, the ratio of length to width is between 5 and 6 to 1. This is preferably greater than 3:1 to prevent what is believed to be eddying or convection of air that can allow cold air to drop from the freezer chamber as warm air rises through a too-wide and too-short passage. A long and thin passage resists this air exchange that might be found in a device that has broad open channels even with a limited thickness. Thus, the corrugations provide not only structural crush resistance, but also help to avoid the unwanted exchange of air.

The device may be positioned on any location about the entire periphery of the appliance rim. However, positioning near the hinge edge tends to be less conspicuous. More important, positioning at the lower edge tends to avoid any effect of frosting or condensation. If positioned at the upper edge (as would seem to be appealing to keep the cold air in by gravity when the door is closed), the occasional influx of air after the door is opened and closed may tend to accumulate ice on surfaces below the opening. It has been found that this does not occur when positioning the device at the lower rim of the freezer. This tends not to be a concern for refrigerators.

I claim:

1. A pressure relief facility for a refrigeration appliance with a body defining a chamber and having a peripheral rim, the appliance having a door with a peripheral gasket operable between an open position in which the gasket is away from the rim and a closed position in which the gasket sealably contacts the rim, the relief facility comprising:
    a planar body having opposed major faces;
    the planar body having opposed first and second peripheral edges;
    the planar body defining a plurality of passages adjacent to each other, each passage having a first opening at the first peripheral edge, and a second opening at the second peripheral edge;
    the planar body having a length parallel to the first peripheral edge;
    the passages being distributed along the entire length of the planar body;
    the passages remaining open when the door is in the closed position;
    an adhesive element on one of the major faces adapted to secure the planar body to the rim of the body in registration with the gasket with the first openings in communication with the chamber, and the second openings in communication with ambient air.

2. The facility of claim 1 wherein each major face is a smooth flat surface.

3. The facility of claim 1 wherein the planar body is rectangular.

4. The facility of claim 1 wherein the passages are parallel to each other.

5. The facility of claim 1 wherein the passages are separated from each other by a sheet.

6. The facility of claim 1 wherein the passages are separated from each other by an articulated membrane alternately connected to a pair of sheets each of the sheets providing one of the opposed major faces.

7. The facility of claim 1 wherein the planar body is a piece of corrugated material.

8. The facility of claim 7 wherein the first and second peripheral edges are perpendicular to an axis defined by the corrugated material.

9. The facility of claim 1 wherein the planar body is at least 0.1 inch thick.

10. The facility of claim 1 wherein the planar body is at most 1/4" thick.

11. The facility of claim 1 wherein the planar body is formed of thermoplastic.

12. The facility of claim 1 wherein the planar body is an elongated body having a width defined as the distance between the first and second peripheral edges, and a length greater than the width.

13. A pressure relief facility comprising:
    a refrigeration appliance having a seal surface that is contacted by a gasket;
    a corrugated sheet having opposed major faces and defining a plurality of passages;
    a first one of the major faces being adapted to contact the gasket;
    an attachment facility on a second one of the major faces operable to attach the corrugated sheet to the seal surface;
    the passages remaining open when the first major face contracts the gasket; and
    the passages being distributed along a length of the corrugated sheet.

14. The facility of claim 13 wherein each major face is a smooth flat surface.

15. The facility of claim 13 wherein the passages are separated from each other by a sheet.

16. The facility of claim 13 wherein the corrugated sheet has first and second peripheral edges and the passages are perpendicular to the first and second peripheral edges.

17. The facility of claim 13 wherein the corrugated sheet is at least 0.1 inch thick.

18. The facility of claim 13 wherein the corrugated sheet is at most 1/4" thick.

19. The facility of claim 13 wherein the corrugated sheet is an elongated body having a width defined as the distance between the first and second peripheral edges, and a length greater than the width.

20. A method of improving the operation of a refrigeration appliance with a body defining a chamber and having a peripheral rim, the appliance having a door with a peripheral gasket operable between an open position in which the gasket is away from the rim and a closed position in which the gasket sealably contacts the rim, the method comprising the steps:
- providing a planar element having opposed first and second peripheral edges and defining a plurality of passages extending between the first and second peripheral edges along an entire length of the planar element;
- attaching the planar element to the rim with the first edge in communication with the chamber and the second edge outside of the chamber; and
- wherein the passages remain open when the gasket is in the closed position.

* * * * *